United States Patent [19]

Holm

[11] 4,313,181
[45] Jan. 26, 1982

[54] TORPEDO COUNTERMEASURE

[75] Inventor: Carl H. Holm, Dobbs Ferry, N.Y.

[73] Assignee: The United States of America as represented by the Secretary of the Navy, Washington, D.C.

[21] Appl. No.: 220,947

[22] Filed: Aug. 29, 1962

[51] Int. Cl.³ .............................................. H04K 3/00
[52] U.S. Cl. ...................................... 367/1; 367/112; 367/127; 367/130
[58] Field of Search ..................... 114/235, 235.2, 240; 340/5, 6, 16, 3, 7; 181/0.51, 0.5 W; 367/1, 112, 127, 130

[56] References Cited

U.S. PATENT DOCUMENTS

| | | | |
|---|---|---|---|
| 2,009,451 | 7/1935 | Kunze | 367/130 |
| 2,405,694 | 8/1946 | Herzmark | 367/1 X |
| 2,557,900 | 6/1951 | Wallace, Jr. et al. | 367/117 |
| 2,622,691 | 12/1952 | Ording | 367/49 |
| 2,979,015 | 4/1961 | Estes | 367/1 X |

Primary Examiner—Richard A. Farley
Attorney, Agent, or Firm—Robert F. Beers; Arthur A. McGill

EXEMPLARY CLAIM

1. Apparatus for protecting a vessel from a waterborne missile launched underwater by air pressure, comprising means for continuously listening to port and to starboard at three spaced locations at predetermined progressive distances astern of the vessel for any waterborne wavefront radiated as a consequence of a waterborne missile launching, and for detecting the passage of such wavefront across each of said spaced locations, means for signalling aboard the vessel the passage of such wavefront across any of said locations, and means for recording on a time base the instants that such wavefront crosses each of said locations and the approximate arrival direction of the wavefront in terms of port or starboard, whereby proper evasive action for the vessel may be determined and taken.

10 Claims, 5 Drawing Figures

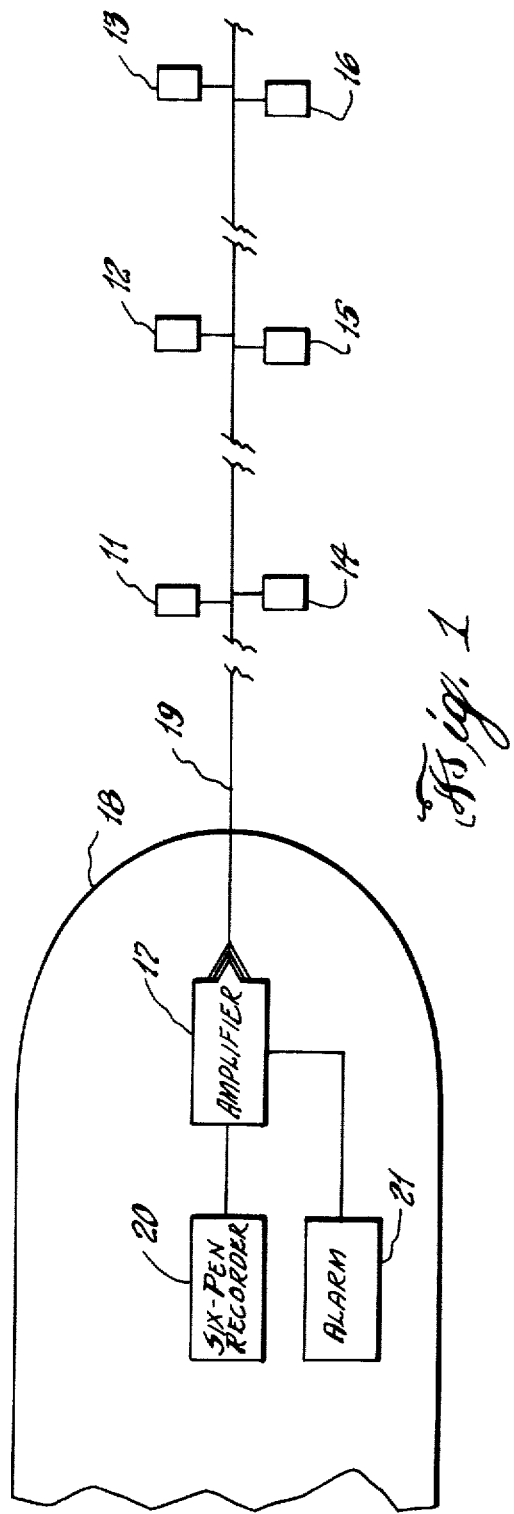
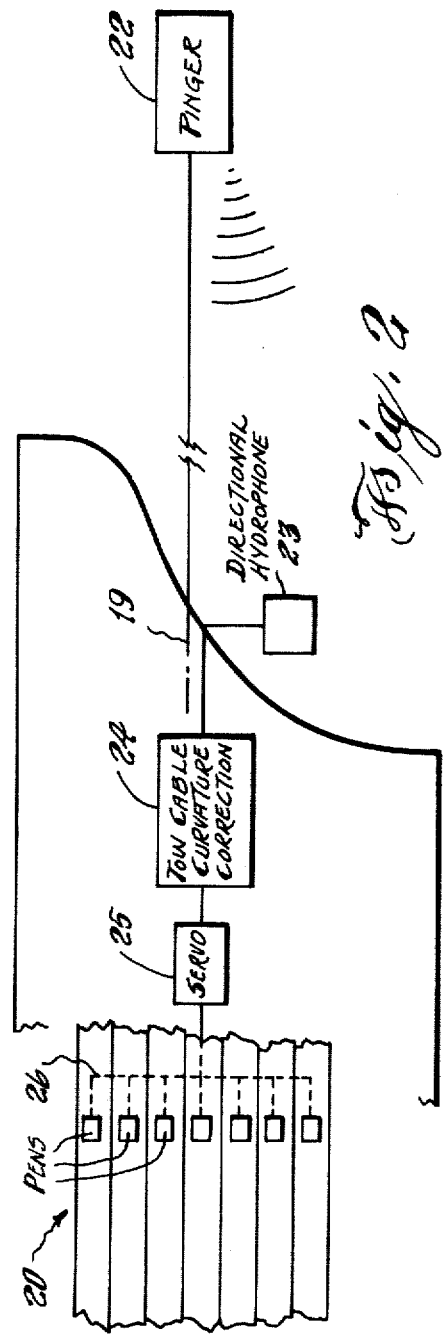

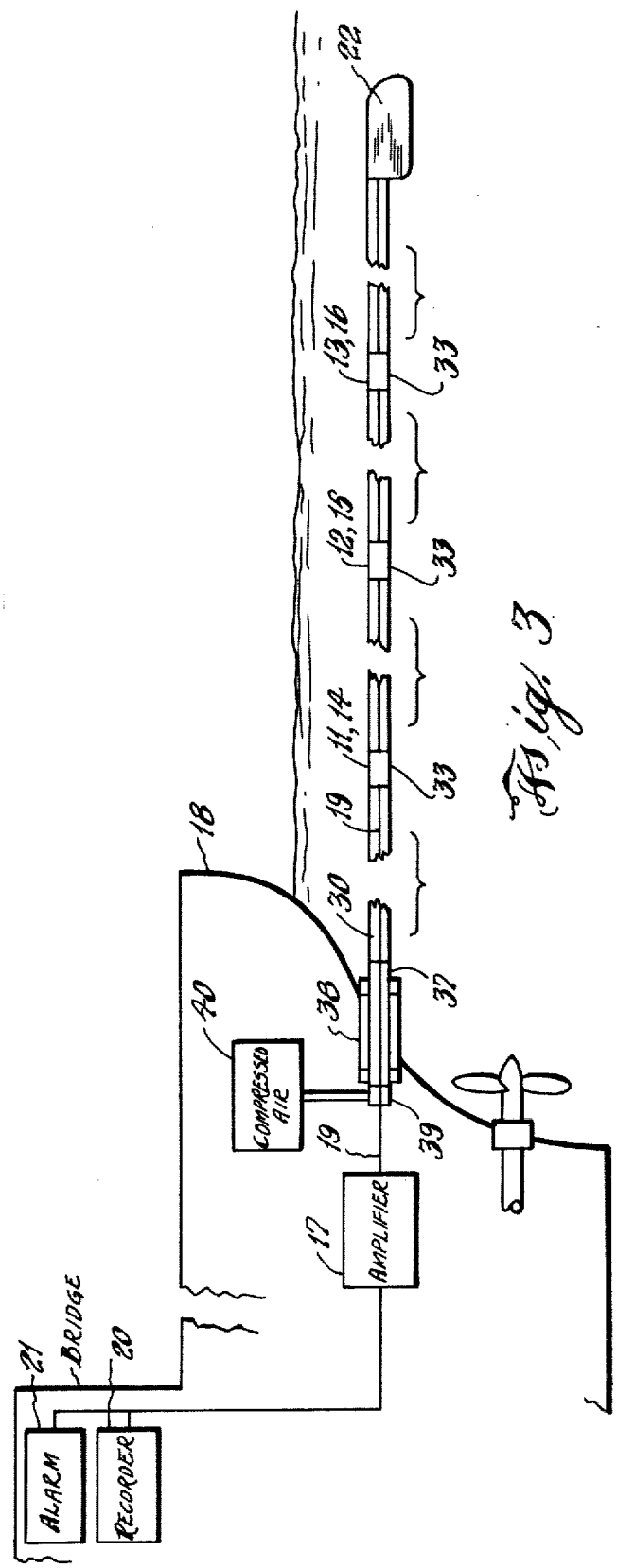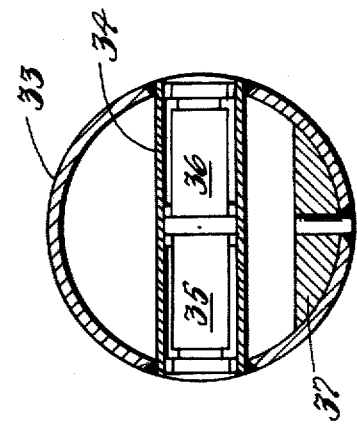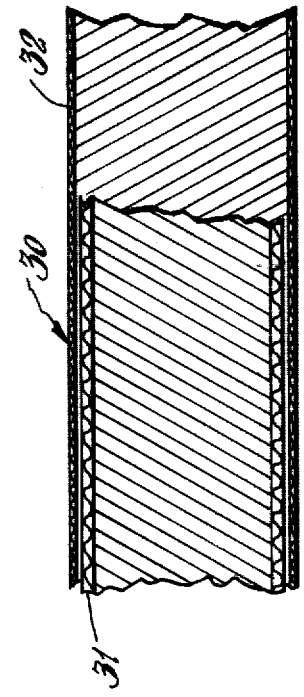

TORPEDO COUNTERMEASURE

The invention described herein may be manufactured and used by or for the Government of the United States of America for governmental purposes without the payment of any royalties thereon or therefor.

This invention relates to protective measures for a ship or a convoy of ships to guard against torpedo or other waterborne missile attack and more particularly to obtaining earliest possible warning of a torpedo threat to provide maximum opportunity for initiating countermeasures.

Wartime experience has proven that one effective countermeasure for a ship or a convoy of ships threatened by an oncoming torpedo is for the ship or ships to alter course as quickly as possible after the torpedo is detected, to parallel the course of the torpedo. If a ship or a convoy of ships are headed parallel to the course of an oncoming torpedo, the ships present the smallest possible target to the torpedo and the chances of avoiding the torpedo are greater than they would be if the courses of torpedo and ship were perpendicular. Furthermore, when a ship is on a course parallel to the course of a torpedo, it is more readily apparent on the ship whether the ship and torpedo are on a collision course and if so, the ship has more opportunity to veer off out of the path of the torpedo.

Another possible countermeasure is for the threatened ship or a fast escort vessel or a helicopter to drop a series of countermining explosive charges in the path of the torpedo to deflect, damage, or destroy the torpedo, which charges are buoyant and float at or near the surface and detonate under the control of time delay fuses, or fuses which are armed by a timing device and subsequently activated by an acoustic sensor or a destruct timing device, whichever acts first.

Another countermeasure is to interpose an obstacle between the torpedo and the target ship for detonating the torpedo. When the torpedo is an acoustic target-seeking torpedo, acoustic decoy devices may be put into the water by the threatened ship or by an escort ship or a helicopter.

Regardless of which of these or other counter-measures are put into effect, early warning is essential for success. Visual detection does not afford enough time because the torpedo is dangerously close by the time that it is visually detected; furthermore, some electric torpedoes run with substantially no wake or surface disturbance and cannot be readily sighted.

Detection of a torpedo by ship's sonar is unreliable because of the brevity of the possible detection period. Additionally, detection by the ship's sonar is uncertain until the torpedo is dangerously close because the torpedo generates little sonic power compared to other sonic disturbance in the water particularly in the vicinity of a convoy.

An object of this invention is to improve a ship's torpedo defenses.

A further object is to enable a ship to obtain earlier warning of a torpedo threat than heretofore.

A further object is to detect a submarine torpedo launching in torpedo range of a ship.

A further object is to enable a ship to detect a submarine torpedo launching within a substantial range of the ship and the bearing of the launch site within a few seconds of the launching.

Other objects and advantages will appear from the following description of an example of the invention, and the novel features will be particularly pointed out in the appended claims.

FIG. 1 is a block diagram illustration of the broader aspects of this invention;

FIG. 2 illustrates a feature of the invention which may be used with the combination shown in FIG. 1;

FIG. 3 is an embodiment of this invention in accordance with FIGS. 1 and 2 and in more detail;

FIG. 4 is a cross-section broken away view of towing hose for use in the combination shown in FIG. 3, and FIG. 5 is a cross-section through one of the hose couplings showing the hydrophone mounted therein.

Anti submarine warfare techniques and torpedo designs both have progressed so far since World War II, that if torpedoes are again used in warfare, torpedo launchings would be at greater range from targets than heretofore. Therefore, if a torpedo launching is promptly detected by a ship within torpedo range, the ship will have better opportunity for commencing one or more countermeasures.

The power contained in the blast of compressed air that propels a torpedo out from a submarine torpedo tube is sufficiently high to radiate a detectable wavefront for a substantial distance, as high as 15,000 yards, which distance exceeds effective torpedo range. The speed of sound in seawater is about 4800 feet per second, or close to a mile per second. By comparison, torpedo speed which varies with type and design is in the general range of faster ships speed. If a ship or a convoy is able to detect the launching of a torpedo within torpedo range and the bearing of the launch site almost immediately after a torpedo is launched, the time available for countermeasures is optimized.

The wavefront from the blast of compressed air is steep and a major part of the considerable power of the compressed air blast is distributed in the frequency band 10-20 kilocycles per second.

In its broader aspects this invention includes continuously listening for a pulse of acoustic energy in the 10-20 kilocycle band exceeding a predetermined threshold at each of a plurality of locations variously spaced from a ship and moving in concert along with the ship and transferring such signals to the ship. Bearing of the origin of a wavefront is derived from the detection sequence and time spread between detection of the wavefront by the plurality of detecting hydrophones.

The broader aspects of this invention are illustrated in FIG. 1 and include six substantially identical hydrophone units 11, 12, 13, 14, 15, 16, amplifier means 17 on ship 18 separately electrically connected to each of the hydrophone units through a conductor cable 19, and separately amplifying signals from the respective hydrophones in the 10-20 kilocycle band and exceeding a predetermined threshold. Preamplifiers, not shown, may be included. Bandpass filters and threshold elements are in the amplifier 17. Preamplifiers, not shown, may be included adjacent the respective hydrophones. Amplified signals are conducted to respective pens of a six pen recorder 20 and to a signal operated alarm device 21. The conductor cable 19 and the hydrophone units are towed by the ship 18 at a predetermined shallow depth, e.g. 10-30 feet. Each hydrophone unit is sensitive to at least the 10-20 kilocycle band and is designed and/or baffled to have a sensing beam pattern that is as narrow as possible in the vertical direction to minimize pickup from surface and bottom, and that is up to but no greater than 180 degrees in azimuth, to sense signals arriving from either the port or starboard directions. The hydrophones 11 and 14 are on the order of several hundred feet from the stern of ship 18 so as to be beyond the wake turbulence; the hydrophones 12 and 15 and the hydrophones 13 and 16 are approximately 200 feet successively further along the tow cable to insure a recognizable time spread between detection of wavefront by the three hydrophones. The tow cable which is not shown in FIG. 1 is coextensive with the conductor cable 19 and is designed for adequate strength to withstand towing stresses at maximum acceleration and maximum speed of the ship. The combination of tow cable and hydrophones are constructed so that the axes of the hydrophone sensing patterns are substantially horizontal.

The recorder is preferably of the type in which the pens do not write continuously but are solenoid operated to register the amplitude of a signal detected by the respective hydrophone. The wavefront of a torpedo launching detected by a hydrophone will be recorded as a pip. To conserve paper, the recorder paper may be in the form of an endless web that completes a round in a convenient time interval, e.g., 15 minutes. The paper is driven at a constant rate of speed to provide a reliable time base and preferably is calibrated in convenient time units and/or distance units. The six pens are aligned transversely of the web and arranged to register their respective markings along six distinct record tracks. A relay operated alarm 21 is energized when a signal is received to draw immediate attention to the recorder 20. Because it is impractical to consume vital time to determine mathematically the origin of a signal detected by hydrophones 11, 12, 13, or 14, 15, 16, and registered on the recording web, the relationship between signal origin in terms of bearing and range and the time distribution of wavefront detection by the hydrophones is charted for reference whereby comparison of recorded markings against the reference enables one to quickly determine bearing and range of the origin of the detached wavefront. Preferably the two groups of three pens corresponding to the two groups of three hydrophones record in different colors or make other plainly distinguishable markings so that no confusion will arise as to whether the wavefront origin is to the port or starboard side of the ship.

An example of stringer construction, hydrophone depth control and hydrophone orientation control that may be used in an embodiment of this invention is shown in my U.S. Pat. No. 2,404,440.

The invention as thus far described provides accurate information as to the site of a torpedo launching when the ship is proceeding on a straight course and constitutes a substantial advance in this art. However, if the invention were to detect a torpedo launch during a substantial change of course, it would not provide accurate information. In FIG. 2 there is illustrated a mechanism that inserts a correction in the recorder when the ship's course is changing. The apparatus includes a pinger 22 towed at the end of the cable 19 for emitting forwardly periodic short range pulses in a substantially higher frequency than 10–20 kilocycles. The pulses emitted by the pinger are sensed by a ping detector directional hydrophone 23 carried by the stern of the vessel for sensing the pinger pulses. The directional hydrophone 23 provides an error signal to a tow cable curvature correction circuit 24 where it is compared against a reference voltage, that corresponds to ship and tow in line, to operate a servo 25. Mechanical linkages 26 between the pens of the recorder and the servo 25 operate to shift the pens relative to one another along their respective recording tracks when the pinger 22 is not in line with the longitudinal axis of the ship to add a compensating correction. The compensating correction is programmed into the design of these elements on the basis of data taken under operating conditions showing relationship between error voltage and course change.

In the embodiment shown in FIG. 3, the cable 19 and the hydrophones are carried by a coated fabric hose 30. The hose is of double bias construction shown in FIG. 4 and includes an inner layer 31 and an outer layer 32 formed with opposing bias and with the outer layer thinner than the inner layer so that there is no twisting torque when the hose is under tension. This type of hose is termed non rotating or non spinning hose. The layers are impregnated with pliable elastomeric or plastic sealing material to render the hose water tight and air tight. The hydrophone pairs are mounted in hose couplings 33; reference marking or locating pins, not shown, are included in the coupling elements and the hose section terminations to insure proper orientation of the couplings relative to the hose at assembly.

Each hydrophone pair is mounted in a coupling 33 as shown in FIG. 5. The hydrophone pair is assembled in line in a sleeve 34. Conductors 35, 36 extend through the sleeve and the combination is potted in acoustically transparent material, e.g. polyurethane. If the sensing faces are of material non-corrosive in seawater, e.g. titanium, the potting material does not overlay the sensing faces. A weight member 37 is secured in place in the coupling to further assure horizontal orientation of the hydrophones. The hydrophone subassembly is secured and sealed in place in the coupling. There is sufficient clearance between the coupling inner surface, hydrophone subassembly, and the weight, for conductor cable 19 to extend therebetween and for passage of air.

The shipboard end of the stringer 19 includes a rigid section 37 that assembles in a packing gland 38 in the ship's hull to preserve water-tight integrity. A fitting 39 is secured to the shipboard end of the stinger and provides for connection to a compressed air source, provides a fluid-tight passage for conductor cable 19 and seals the shipboard end of the stringer. In use the hose is charged with compressed air on the order of 100 pounds per square inch to inflate the hose and to enable the hose to resist sinuous configuration of the hose.

The towed combination is provided with a depressor, not shown, for maintaining the former at a desired submergence depth, preferably below wake and surface disturbances.

This invention also may be used on a common stringer or on separate stringers in combination with torpedo countermining devices as described in my above-mentioned patent and with acoustic decoys of the general type described in U.S. Pat. No. 2,397,107 to decoy acoustic homing torpedoes away from the target ship and into destructive range of explosive charges, and with transponder devices for detecting, recording and reradiating sonar from active acoustic torpedoes at an amplified energy level to decoy active acoustic homing torpedoes away from the target ship and into destructive range of explosive charges, for countering all types of passive and active torpedoes.

It will be understood that various changes in the details, materials and arrangements of parts and steps, which have been herein described and illustrated in order to explain the nature of the invention, may be made by those skilled in the art within the principle and scope of the invention as expressed in the appended claims.

I claim:

1. Apparatus for protecting a vessel from a waterborne missile launched underwater by air pressure, comprising means for continuously listening to port and to starboard at three spaced locations at predetermined progressive distances astern of the vessel for any waterborne wavefront radiated as a consequence of a waterborne missile launching, and for detecting the passage of such wavefront across each of said spaced locations, means for signalling aboard the vessel the passage of such wavefront across any of said locations, and means for recording on a time base the instants that such wavefront crosses each of said locations and the approximate arrival direction of the wavefront in terms of port or starboard, whereby proper evasive action for the vessel may be determined and taken.

2. Apparatus for protecting a vessel from a waterborne missile comprising means for continuously listening in port and starboard directions respectively at a plurality of spaced locations at progressive distances astern of the wake turbulence of the vessel for any waterborne wavefront in the frequency band 10–20 kilocycles per second, means to register the instants that such wavefront crosses each of said spaced locations and whether the wavefront arrival direction at said locations is from port or starboard, whereby proper evasive action for the vessel may be quickly determined and initiated.

3. Apparatus for protecting a vessel from a waterborne missile comprising means for continuously listening to port and starboard for a waterborne wavefront of acoustic energy between 10–20 kilocycles per second and exceeding a predetermined threshold and of a predetermined wavefront steepness at predetermined progressive distances astern of the wake turbulence of the vessel, means for signalling aboard the vessel the passage of such wavefront across any of said locations, means for recording the instants that such acoustic energy crosses each of said spaced locations and whether the acoustic energy arrival direction at said locations is from port or starboard, whereby proper evasive action for the vessel may be quickly determined and initiated.

4. Apparatus for warning a ship against a waterborne missile comprising means attached to the vessel for continuously listening to port and starboard at predetermined progressive locations astern of the wake turbulence of the vessel for a waterborne wavefront of acoustic energy between 10–20 kilocycles per second and exceeding a predetermined threshold and of a predetermined wavefront steepness, means aboard the vessel electrically coupled to said listening means for signalling the passage of said wavefront across any of said locations, and means aboard said vessel electrically coupled to said listening means for recording on a time base the instants that such wavefront crosses each of said spaced locations and whether the arrival direction at said locations is from port or starboard.

5. Apparatus as defined in claim 4, further comprising means for compensating for out-of-line orientation of said ship and said listening means during change of course.

6. Apparatus as defined in claim 4, wherein said listening means includes a flexible hose shaped stringer and three pairs of hydrophones spaced along the stringer for sensing in port and starboard directions respectively at each of the three locations.

7. Apparatus as defined in claim 6, wherein said hose-shaped stringer is fluid tight, said apparatus further comprising a source of compressed air on said ship for continuously pressurizing the interior of the stringer, and means on said stringer for continuously urging the stringer parts carrying said hydrophones to an orientation relative to the stringer axis for directing the hydrophones horizontally.

8. Apparatus for continuously listening at at least three spaced locations at progressive distances astern of the vessel for any waterborne wavefront radiated as a consequence of a waterborne missile launching to detect the instants that such wavefront crosses each of said spaced locations and the approximate bearing and range of the wavefront origin, (a) a buoyant stringer secured to and extending from the stern of the ship for at least 600 feet, (b) six substantially identical directional hydrophone units secured to and carried by the stringer in back-to-back pairs approximately 200 feet, 400 feet, and 600 feet astern of the ship, (b) a weight member secured in place in the stringer contiguous with each pair of hydrophones, for orienting the directivity axes of the hydrophone units horizontally, (c) each of the hydrophone units having a sensing beam pattern that is narrow in the vertical direction to minimize pickup from surface and bottom and that is up to but no greater than 180 degrees in azimuth to sense launch wavefront signals arriving from port and starboard respectively, (d) each hydrophone being sensitive to at least the 10–20 kilocycle band, (e) amplifier means on the ship separately electrically connected to each of the hydrophone units and separately amplifying signals from the respective hydrophone units in the 10–20 kilocycle band, (f) a six-pen recorder of the type in which a paper web is adapted to be driven under the pens at a constant rate of speed to provide a time base and the six pens being aligned transversely of the web for registering along six distinct record tracks, said pens being normally out of engagement with the paper web and responsive to respective signals to register the amplitudes of signals transverse to the record track, (g) for indicating approximate bearing and range of a wavefront origin.

9. Apparatus as defined in claim 8, further comprising (h) a pinger connected to and towed by the end of the stringer for emitting forwardly periodic short range pulses in a substantially higher frequency band than 10–20 kilocycles, (i) a directional hydrophone carried by the stern of the vessel for sensing the pinger pulses and for providing an output which is a function of stringer curvature, (j) and means responsive to the output of the pinger pulse sensing directional hydrophone to shift the pens relative to one another along their respective recording tracks when the pinger is not in line with the longitudinal axis of the ship to add a compensating correction.

10. Apparatus as defined in claim 8, further including an alarm operative when signals are applied to the pens.

* * * * *